United States Patent [19]
Gibson, Sr.

[11] 3,765,117
[45] Oct. 16, 1973

[54] SNAG-PROOF PROTECTORS FOR FISHING HOOKS

[76] Inventor: Robert L. Gibson, Sr., Grove St., Brookfield, Ohio 44403

[22] Filed: Aug. 9, 1972

[21] Appl. No.: 279,216

[52] U.S. Cl. ................................. 43/42.1, 43/43.4
[51] Int. Cl. ............................................. A01k 85/00
[58] Field of Search ............................. 43/42.1, 43.4

[56] References Cited
UNITED STATES PATENTS
2,332,400  10/1943  Richardson .......................... 43/42.1
3,170,756  2/1965  Butler .................................. 43/43.4
3,722,128  3/1973  Tremblay ............................. 43/42.1

Primary Examiner—Louis G. Mancene
Assistant Examiner—Daniel J. Leach
Attorney—Michael Williams

[57] ABSTRACT

A snag-proof protector for a fishing hook formed of resilient plastic material and providing a conical skirt about the shank of the hook, with the small end of the cone facing the barb of the hook and the large open end of the conical skirt facing the line attaching means of the hook.

7 Claims, 8 Drawing Figures

PATENTED OCT 16 1973 3,765,117
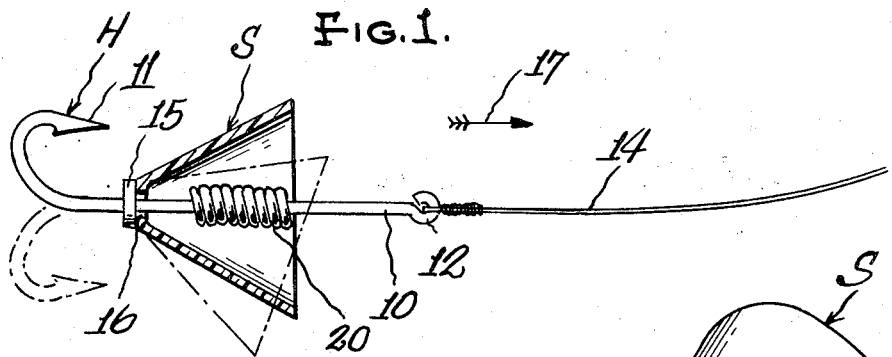
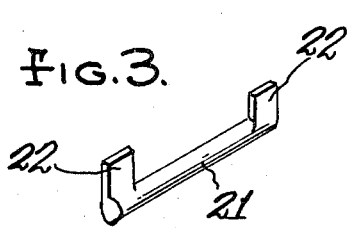
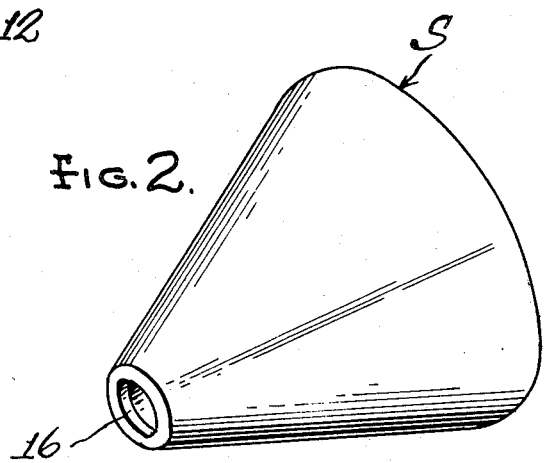
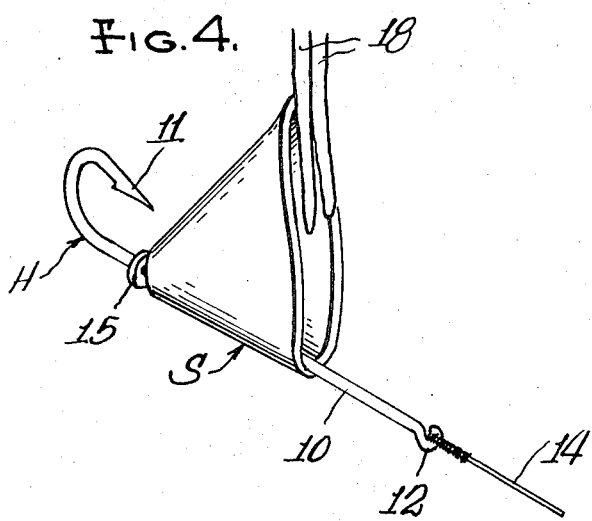
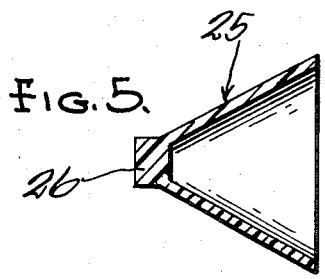
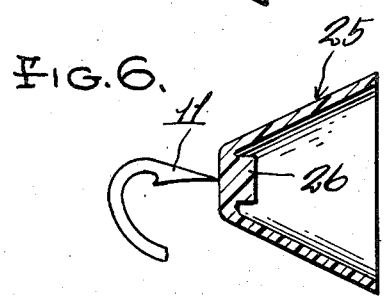
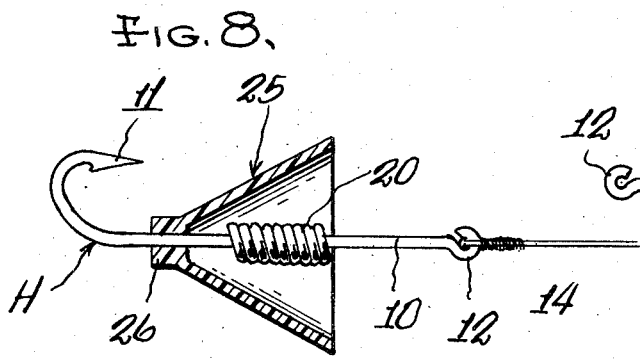
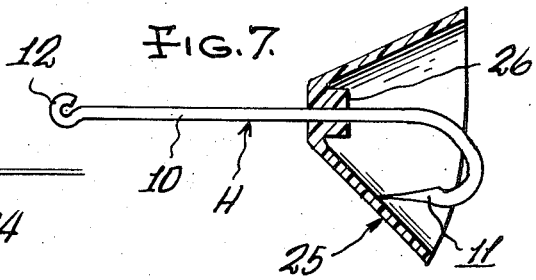

SNAG-PROOF PROTECTORS FOR FISHING HOOKS

BACKGROUND AND SUMMARY

Snag-proof hook protectors are known in the art, and a good example is disclosed in U. S. Pat. No. 3,170,756, to C. L. Butler. However, in all the prior art with which I am acquainted, the protectors are disposed in the manner shown in the Butler patent. In this patent, a hollow cone-shaped protector, of resilient material, is supported on the shank of a fishing hook, with the large open end of the cone facing the barb of the hook. In such prior art, it was believed that the cone shape of the protector would deflect snagging material away from the barb as the hook is drawn through the water by the fishing line. However, I have discovered that because of the flexibility of the material of the protectors of the prior art, snagging matter in the water would deform the protector inwardly toward the hook shank and thus expose, rather than protect, the barb of the hook to snagging matter.

After considerable experimentation, I have discovered that if the cone-shaped protector is reversed on the shank, with the small end of the cone facing the barb, practically all snagging problems have been eliminated since the large open end of the cone would first be engaged by the snagging matter when the hook is drawn through the water by the fishing line. Such engagement stretches or distends the large open end of the cone to completely shield the barb.

DESCRIPTION OF THE DRAWING

In the drawing accompanying this specification and forming a part of this application, there are shown embodiments which my invention may assume, and in this drawing:

FIG. 1 illustrates a conventional fish hook with a snag protector, in section, assembled therewith to illustrate an embodiment of my invention, FIG. 2 is an enlarged, perspective view of the snag protector, FIG. 3 is a perspective view of a form of weight which may be used, FIG. 4 is a perspective view showing the condition of the snag protector in operation, FIG. 5 is a sectional view showing a slightly modified form of snag protector, FIGS. 6 and 7 illustrate steps in the assembly of the snag protector of FIG. 5 with a fish hook, and FIG. 8 illustrates the snag protector of FIG. 5 in assembled relation.

DESCRIPTION OF THE PREFERRED EMBODIMENT

In FIG. 1 there is shown a conventional fish hook H, which has a shank 10, a barb 11 at one end of the shank and an eye 12 at the opposite shank end. A fish line 14 is secured to the eye in conventional manner. The shank is provided with an abutment 15, which may be a circular collar soldered or otherwise fixed to the shank.

The snag protector S is formed of resilient, plastic material and one material found suitable is polyvinyl chloride. The protector is preferably molded to the hollow, conical shape shown, although other hollow shapes may be used equally as well. The protector provides a skirt which surrounds the shank 10, and is assembled on the shank with the small end of the cone facing the barb 11 and adapted to abut the collar 15 to limit movement of the protector in the direction of the barb 11.

The small end of the cone is formed with an opening 16 which is somewhat larger than the cross-section of the shank. Thus, the protector may be assembled with the hook by threading the small end over the eye 12 and moving the protector along the shank to abutment with the collar 15. Although the protector is shown in full lines as coaxial with the shank, it will be appreciated that the rather larger opening 16 will permit the protector to wobble about the shank, as suggested in dot-dash lines. This wobbling action of the protector is desirable since it causes the assembly to dart from side-to-side like an action lure as it is drawn through the water in the direction of the arrow 17 shown in FIG. 1, and thus attracts the attention of any fish in the vicinity.

The large end of the cone-shaped protector is of such transverse size that the transverse distance from the shank 10 to the skirt wall is substantially as great, and preferably slightly greater, than the transverse distance from the shank to the barb 11.

A protector made of polyvinyl chloride provides a hollow conical body that is relatively soft, yet form retaining, so that any fish that bites on the hook will deform the skirt wall and thus not be impeded from being caught on the hook. This flexibility is also desirable when the assembly is drawn through water that has weeds, stumps or other snagging matter. As shown in FIG. 4, when the assembly is drawn by the line 14 in the direction of the arrow 17, snagging matter 18 will first engage the large end of the cone-shaped body, and the pulling force will cause the skirt wall to stretch or distend to the long, eliptical shape shown to completely shield the barb 11. The pulling force will cause the distended skirt wall to ride over the snagging material and in so doing will move the barb clear of any snag.

The protector will also prevent snagging of sinker material of the type suggested in FIGS. 1 and 3. FIG. 1 shows a lead wire 20 wound around the shank of the hook and disposed within the confines of the skirt wall of the protector. A sinker of the type shown in FIG. 3 may also be used, such sinker comprising an elongated lead body 21 having tabs 22 extending transversely at opposite ends. The body may be disposed to lie along the shank 10 and the tabs bent in opposite directions around the shank.

Although only a single barb is shown in full lines in the drawing, the shank may carry a second barb, as shown in dot-dash lines in FIG. 1, or more than two barbs. Also, the invention may be used on hooks carried by conventional spoons or plugs.

DESCRIPTION OF OTHER EMBODIMENT

The embodiment disclosed in FIGS. 5 through 8 incorporates many of the desirable features of the embodiment heretofore discosed. As before, the protector 25 is molded from a resilient plastic material, such as polyvinyl chloride, and is adapted to be assembled with a fish hook, parts of which are identified by the same reference numerals as used heretobefore. In this case, the assembly is limited to a hook having only one barb.

The protector 25 has a shape similar to that before described but in this instance, the small end of the conical body is formed with a solid, normally outwardly disposed extension 26. To assemble the protector on the hook in the position shown in FIG. 8, the protector is turned inside out to the condition shown in FIG. 6, wherein the extension 26 is within the conical body. The barb 11 is then forced through a central portion of the extension and the protector is threaded along the shank 10, to the position suggested in FIG. 7. The flexible skirt wall will deform to readily accommodate manipulation of the hook to the position shown in FIG. 7, and when such position is reached, the conical body is again turned inside out from the relation of FIGS. 6 and 7, to the normal relation shown in FIGS. 5 and 8. By reason of this method of assembly, the shank 10 is resiliently gripped and the protector 25 is frictionally held against unintentional movement along the shank.

I claim:

1. A snag-proof hook assembly comprising a fishing hook having a shank, a barb at one end of said shank and means for attaching a fishing line at the other end of said shank, and a protector for protecting said barb against snagging, said protector being formed of resilient plastic material and when assembled with said hook providing a skirt which surrounds said shank, said skirt at one end being of a transverse size slightly larger than the cross-section of said shank and providing an opening through which the latter extends, said skirt enlarging to a larger transverse size at its opposite end so that the transverse distance from the shank to the skirt at said opposite end is substantially as great as the transverse distance from said shank to said barb, the small end of said skirt facing said barb and the large end of said skirt facing the line attaching means, whereby when said assembly is drawn through the water by said fishing line, the large end of said skirt will first engage any snagging matter and be distended thereby to completely shield said barb.

2. The construction according to claim 1 wherein said skirt is cone-shaped.

3. The construction according to claim 2 and further including an abutment on said shank for engagement with the small end of said skirt.

4. The construction according to claim 3 wherein the opening provided at the small end of said skirt is considerably larger than the cross-section of said shank so that said protector may wobble about said shank, said abutment limiting movement of said protector along said shank in the direction toward said barb.

5. The construction according to claim 1 wherein said skirt one end has a friction fit with said shank to restrict mvoement of said protector along said shank.

6. The construction according to claim 5 wherein said skirt one end is formed with a projection through which said shank extends with a friction fit.

7. The method of assembling a fish hook with a barb protector, wherein said hook includes a shank having a barb at one end and line attaching means at the other end, and wherein said protector is formed of resilient plastic material to hollow conical shape, the small end of the cone having a solid, normally outwardly disposed extention of about the same cross-sectional size, the improved method comprising, turning the cone-shaped protector inside out so that said solid extension is disposed inwardly of the cone shape, forcing the barb through a central portion of the solid extension and moving the protector along said shank to a predetermined position, and then returning the protector to its original form wherein said extension is outward of the cone shape.

* * * * *